5368X
P. Williamson.
Cooking Stove.
Patented Feb. 16, 1829.
Fig: 1.
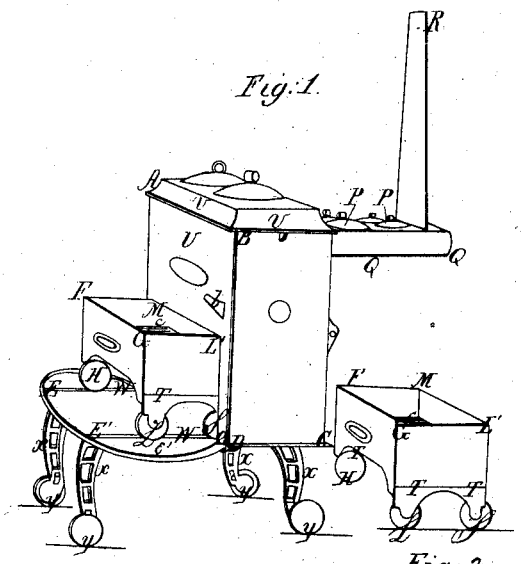
Fig: 2.
Fig. 3.
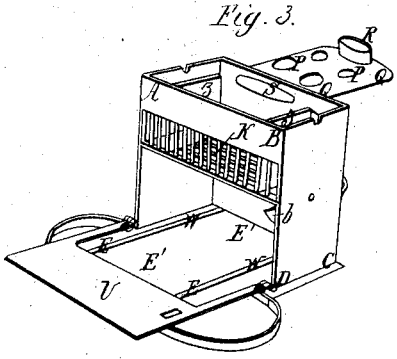
Witnesses
Geo P Bourdon
John
Thos R Jones
Geo Weston
Inventor
P. Williamson

United States Patent Office

PTO - BOYERS, PA Duty Station

MISSING PAGE TEMPORARY NOTICE

PATENT # 5368X FOR ISSUE DATE 2-16-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa